United States Patent [19]

Yamashita et al.

[11] Patent Number: 4,523,800
[45] Date of Patent: Jun. 18, 1985

[54] POLYGONAL MIRROR OPTICAL DEFLECTOR

[75] Inventors: Mitsuo Yamashita, Yokohama; Goro Oda, Sagamihara; Masashi Kamiya, Tokyo, all of Japan

[73] Assignee: Tokyo Shibaura Denki Kabushiki Kaisha, Kawasaki, Japan

[21] Appl. No.: 513,796

[22] Filed: Jul. 14, 1983

[30] Foreign Application Priority Data

Jul. 20, 1982 [JP] Japan ................. 57-126122
Jul. 30, 1982 [JP] Japan ................. 57-133557

[51] Int. Cl.³ ............................................ G02B 27/17
[52] U.S. Cl. ........................................ 350/6.7; 308/10; 310/90; 384/115
[58] Field of Search ............ 308/10; 310/90, 157, 310/156; 384/115, 123, 113; 350/6.5, 6.7

[56] References Cited

U.S. PATENT DOCUMENTS

| 2,766,695 | 10/1956 | Gailloud | 310/90 |
| 2,904,709 | 9/1959 | Lautner | 310/90 |
| 3,851,933 | 12/1974 | Jacobson | 384/113 |
| 4,438,987 | 3/1984 | Kapaan | 308/10 |
| 4,443,043 | 4/1984 | Yamaguchi | 310/90 |

FOREIGN PATENT DOCUMENTS

| 6854 | 3/1978 | Japan | 308/10 |
| 50318 | 3/1983 | Japan | 384/123 |
| 0572384 | 10/1945 | United Kingdom | 384/115 |

OTHER PUBLICATIONS

Nikkei Mechanical; 1981/11/9; pp. 33, 34.
NHK Lab's Note; No. 242; Y. Kameyama et al.; 10/79; pp. 3-10.

Primary Examiner—R. Skudy
Attorney, Agent, or Firm—Cushman, Darby and Cushman

[57] ABSTRACT

A shaft is fixed within a motor housing in an electric motor unit. The shaft is provided with bearing sections having herringbone-shaped grooves formed therein. The shaft is inserted into a hollow cylindrical spindle and the journal sections in the smooth inner surface of the spindle are allowed to face the bearing sections so as to constitute a dynamic pressure type radial bearing supporting the spindle in the radial direction. Stator ring magnets are fixed to the motor housing, and rotor ring magnets are fixed to the hollow cylindrical shaft. The inner surface of the stator magnets faces the outer surface of the ring magnets. These magnets are magnetized such that the mutually facing regions have opposite magnetic poles. The stator and rotor magnets form a magnetic thrust bearing; that is, the spindle is suspended by the attractive force generated between the magnets.

7 Claims, 3 Drawing Figures

POLYGONAL MIRROR OPTICAL DEFLECTOR

BACKGROUND OF THE INVENTION

This invention relates to an electric motor unit, and more specifically, to an electric motor unit for rotating a polygonal mirror.

In general, an optical deflector of a polygonal mirror type is provided with a motor unit to rotate a polygonal mirror at high speed, e.g., scores of thousands of revolutions per minute. In such a motor unit, friction between a motor shaft and bearings should be minimized for high-speed rotation. To meet this requirement, Japanese Patent Publication No. 6854/78 teaches a motor unit of a tilting pad type. In the motor unit of the tilting pad type, the motor shaft is radially supported by journal bearings of a dynamic pressure type, and is suspended so as to be axially supported by a repulsive force produced between permanent magnets individually fixed to an end of the motor shaft and a motor housing. Having its motor shaft supported both radially and axially, this motor unit is suitable for high-speed rotation, although it has the certain drawbacks. Suspended by the repulsive force between the pair of permanent magnets, the motor shaft is liable to vibrate due to external vibrations or the like, and the rotation may become somewhat eccentric. Moreover, the arrangement of the permanent magnets along the axis of the motor shaft increases the size of the motor unit.

The use of a motor unit having these problems in the optical deflector of the polygonal mirror type will cause the following additional problems. Since the incidence position of a laser beam incident upon the polygonal mirror changes as the motor shaft vibrates along its axis, the polygonal mirror must have a sufficient width. Therefore, the polygonal mirror increases in cost and weight, so that the rotary load on the motor unit increases, which reduces the starting capability of the motor unit. In a deflector so designed that the light reflecting surfaces of the polygonal mirror are at an angle to the axis of the motor shaft, the scanning rate of a laser scanned by the polygonal mirror varies as the incidence position of the laser beam is changed by the vibration of the motor shaft.

U.S. patent application Ser. No. 411,959 filed on Aug. 26, 1982, now U.S. Pat. No. 4,443,043, a motor unit intended to solve the above noted problems inherent in the conventional motor unit. In this U.S. Application, the motor shaft is supported by a pair of radial bearings of a dynamic pressure type and by the attractive force between pairs of ring magnets. According to the magnetic thrust bearing employed in the motor unit, the motor shaft is floated by the attractive force. Thus, the motor shaft is unlikely to vibrate even if external force is applied thereto. In addition, since the shaft and the ring magnets are coaxially arranged, enlargement of the motor unit can be prevented. However, the motor unit proposed in the U.S. Application necessitates high assembly precision, rendering it necessary to allow sufficient time for processing, assembling and adjustment. Naturally, production of the motor unit in question is low in productivity, making it difficult to keep down the manufacturing cost of the motor unit.

To be more specific, one of the paired radial bearings of dynamic pressure type is fixed to the motor housing, with the other radial bearing being fixed to a cover detachably fixed to the motor housing, in order to facilitate the assembly and disassembly of the motor unit. Thus in the assembly of the motor unit, the motor shaft and the paired radial bearings must be aligned coaxially within a margin of error of about 5 μm. It follows that it is likewise necessary to make the cover, housing, bearings and shaft with sufficiently high accuracy. In addition, it is necessary to allow sufficient time for alignment, leading to low productivity and a high manufacturing cost.

SUMMARY OF THE INVENTION

An object of the present invention is to provide an electric motor unit which permits rotating a polygonal mirror at high speed and which can be processed, assembled and adjusted easily.

According to the present invention, there is provided an electric motor unit, comprising:
 a motor housing;
 a fixed shaft extending within the motor housing;
 a hollow cylindrical spindle detachably mounted on the shaft, into which the shaft is inserted;
 a dynamic pressure type bearing supporting the hollow cylindrical spindle in the radial direction;
 a thrust bearing serving to suspend the hollow cylindrical spindle in its axial direction;
 a motor rotor fixed to the hollow cylindrical spindle; and
 a motor stator fixed to the housing and serving to rotate the motor rotor.

DETAILED DESCRIPTION OF THE PREFERRED EMBODIMENT

Figure 1:
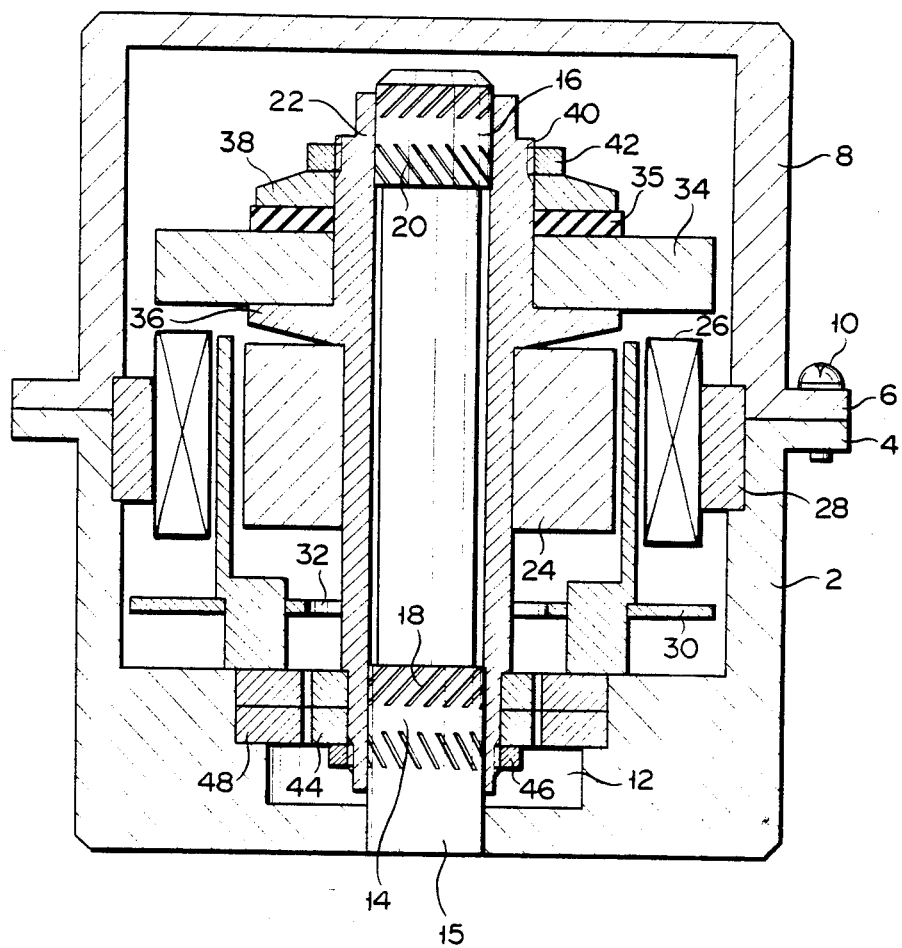
FIG. 1 is a cross-sectional view schematically showing a polygonal mirror type optical deflector provided with an electric motor unit according to one embodiment of the present invention.

FIG. 1 shows a polygonal mirror type optical deflector provided with an electric motor unit according to one embodiment of the present invention. The motor unit comprises a cup-shaped motor housing 2 provided with a flange 4 formed along the outer circumference near the open upper end. A motor cover 8 having a flange 6 is mounted on the motor housing 2 such that the flanges 4 and 6 are brought into mutual contact. In this condition, the motor cover 8 is fixed to the motor housing 2 by at least one screw 10. As a result, an airtight vessel is formed by the motor housing 2 and the motor cover 8. Clean air is sealed in the vessel thus formed. The motor cover 8 is provided with a window (not shown) onto which a laser beam is incident and another window (not shown) from which the deflected laser beam is projected.

A recess 12 is formed in the bottom portion of the motor housing 2. Also, a through-hole coaxial with the motor housing 2 is open to the recess 12. One end of a shaft 15 is inserted into the through-hole and securely fixed to the motor housing 2. The shaft 15 is coaxial with and extends within the motor housing 2. Also, the shaft 15 is provided at both end portions with first and second bearing sections 14 and 16. Herringbone-shaped grooves 18 and 20 of a prescribed arrangement are formed in the bearing sections 14 and 16, respectively, to form dynamic pressure type bearings.

Figure 2:
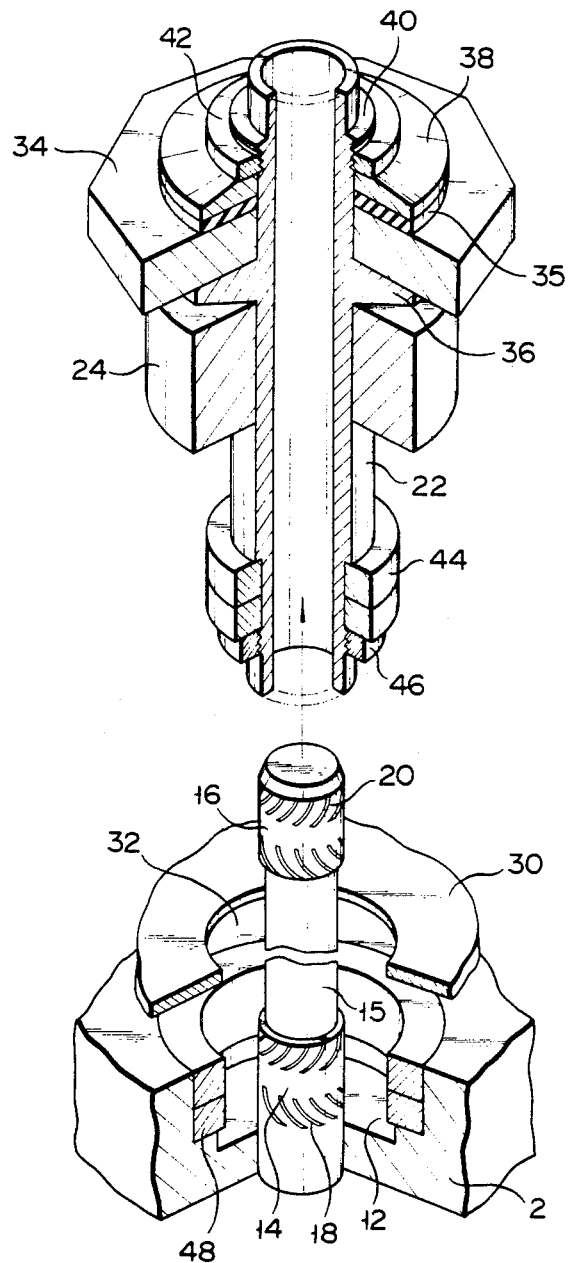
FIG. 2 is an oblique view, partly broken away, of the optical deflector shown in FIG. 1.

As shown in FIG. 2, the fixed shaft 15 is inserted into a hollow cylindrical rotatable spindle 22. A gap of 3-6 μm is provided between the outer surface of the bearing section of the fixed shaft 15 and the inner surface of the hollow cylindrical spindle 22. In addition, those portions of the inner surface of the hollow cylindrical spindle which face the bearing sections 14, 16, i.e., the journal sections, are formed of a super-hard alloy and are very smooth. In other words, the hollow cylindrical spindle 22 is rotatable about the fixed shaft 15 and is detachably mounted on the fixed shaft 15.

A motor rotor 24 is mounted at about the center of the outer circumference of the spindle 22. On the other hand, a motor stator 28 provided with a driving coil 26 to surround the motor rotor 24 is mounted on the inner surface of the motor housing 2 which faces the outer surface of the motor rotor 24. A circuit board 30 provided with a hole 32, which serves to supply a driving current to the driving coil 26, is mounted within the motor housing 2. The spindle 22 is provided with a flange section 36 located above the motor rotor 24. A polygonal mirror 34 is mounted on the flange section 36 such that the reflective surfaces of the mirror 34 are parallel with the axis of the spindle 22. It can be seen that the hollow cylindrical spindle 22 is inserted into the through-hole made along the axis of the polygonal mirror 34. Also, the lower surface of the polygonal mirror 34 is in contact with the upper surface of the flange section 36. The spindle 22 is further inserted into the through-hole made in an elastic sheet 35 and a pressing disk 38, and the elastic sheet 35 and the disk 38 are superposed on the upper surface of the polygonal mirror 34. A nut 42 is inserted into a screw portion 40 of the spindle 25. The polygonal mirror 34 is held between the flange section 36 and the pressing disk 38 by fastening the nut 42, thereby fixing the polygonal mirror 34 to the spindle 22. If the polygonal mirror 34 is fixed, one of the reflective surfaces of the mirror 34 faces the laser beam incident window (not shown) and the laser beam projecting window (not shown).

The hollow cylindrical spindle 22 is provided at the lower outer surface with rotor ring magnets 44 to form a magnetic thrust bearing. The ring magnets 44 are fixed to the spindle 22 by a stopper ring 46. The rotor ring magnets 44 are coaxial with the fixed shaft 15 and arranged within the recess 12. On the other hand, stator ring magnets 48 are fixed to the inner surface of the motor housing 2 defining the recess 12. The rotor and stator ring magnets 44, 48 are coaxially arranged, with a gap of several hundred microns, i.e., about 200 microns provided therebetween, and magnetized such that the mutually facing regions have opposite magnetic poles. In order to allow the spindle 22 to be mounted on or detached from the fixed shaft 15, with the rotor ring magnets 44 kept attached to the hollow cylindrical spindle 22, the inner diameter of the hole 32 of the circuit board 30 is made larger than the outer diameter of the ring magnet 44.

In the polygonal mirror type optical deflector described above, the hollow cylindrical spindle 22 is held suspended by the magnetic thrust bearing consisting of the rotor and stator ring magnets 44 and 48 even when it does not rotate. Thus, if a driving current is supplied to the driving coil 26 to rotate the motor rotor 24, the spindle 22 can be easily rotated even by a low rotary torque. If the spindle 22 begins to rotate, air is introduced through the herringbone type grooves 18, 20 into the clearance between the journal sections of the hollow cylindrical spindle 22 and the bearing sections 14, 16 of the fixed shaft 15. As a result, a dynamic air stream is formed in the clearance mentioned, thereby enabling the spindle 22 to be supported in the radial direction by the dynamic pressure type bearings consisting of the bearing sections 14, 16 and the journal sections of the hollow cylindrical spindle 22. It follows that the polygonal mirror 34 can be rotated stably and at high speed together with the spindle 22, making it possible to deflect the laser beam incident at high speed.

In the optical deflector described above, a pair of bearing sections 14, 16 are formed on the single fixed shaft 15, not on separate members as in the prior art. Thus, the bearing sections 14, 16 can be coaxially arranged accurately in the manufacturing step, making it possible to prevent alignment errors when assembling and disassembling the apparatus. To be more specific, it is possible to adjust the dynamic balance when assembling the optical deflector, with the motor rotor 24, the polygonal mirror 34, the rotor magnet 44, etc. kept mounted on the hollow cylindrical spindle 22. It is also possible to mount the spindle 22 on the fixed shaft 15 without removing the motor rotor 24, etc. from the spindle 22. It follows that an error in the dynamic balance will not take place in assembling the optical deflector, making it unnecessary to perform minute adjustments.

Figure 3:
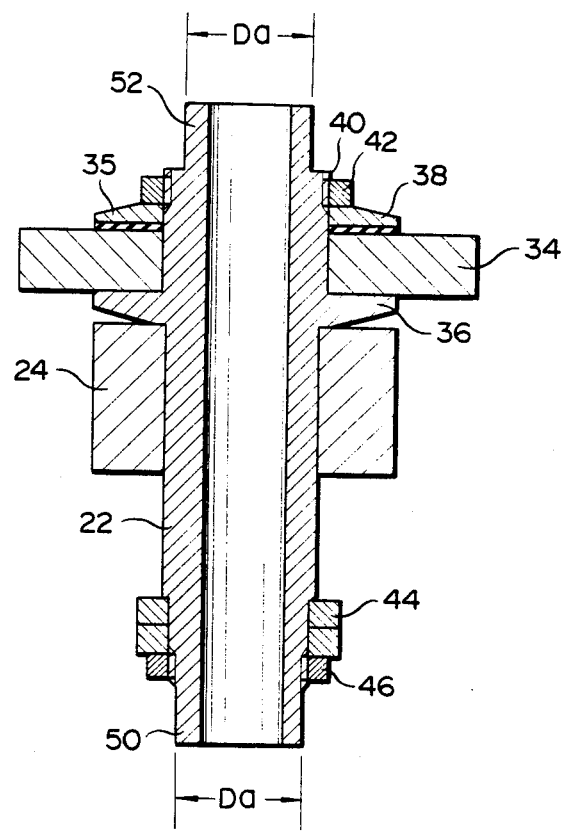
FIG. 3 is a cross-sectional view showing a modification of the optical deflector of FIG. 1.

FIG. 3 shows a modification of the present invention. In FIG. 3, the hollow cylindrical spindle 22 is provided with support portions 50 and 52 at both ends. The support portions 50 and 52, each having an outer diameter Da, facilitate mounting the spindle 22, having the motor rotor 24, the polygonal mirror 34, etc. attached thereto, to a balancer in order to adjust the dynamic balance thereof. Specifically, the support portions 50 and 52 are held by the chuck of a balancer (not shown in the drawings) to enable the spindle 22 to be easily set on the balancer, making it unnecessary to use special tools.

In the embodiment shown in FIG. 1, herringbone type grooves 18, and 20 are formed in the bearing sections 14, 16 and the surfaces of the journal sections of the cylindrical spindle 22 which face the bearing sections are made smooth. However, a dynamic pressure type radial bearing may be formed by making the bearing sections 14, 16 smooth, with the grooves being formed in the journal sections of the hollow cylindrical spindle 22.

In the embodiment shown in FIG. 1, the polygonal mirror 34 is received in the cover 8 and the motor stator 24 is fixed to the motor housing 2. However, the polygonal mirror 34 may be located between the motor rotor 24 and the rotor magnet 44 of the magnetic thrust bearing and the motor stator 28 and the circuit board 30 may be fixed to the cover 8.

In the embodiments described above, the electric motor unit of the present invention is applied to an optical deflector provided with a polygonal mirror. However, the electric motor unit of the present invention can be used for rotating other members.

What is claimed is:
1. A polygonal mirror type optical deflector unit, comprising:
   a housing;
   a shaft extending within the housing;
   a hollow cylindrical spindle detachably mounted on the shaft and having the shaft inserted thereinto;

a polygonal mirror secured to said spindle so as to rotate therewith;

dynamic pressure type bearing means for supporting the hollow cylindrical spindle in the radial direction;

thrust bearing means for magnetically suspending the hollow cylindrical spindle in its axial direction;

a motor rotor fixed to the hollow cylindrical spindle; and a motor stator fixed to the housing for generating a field for rotating the motor rotor.

2. A unit according to claim 1, wherein the dynamic pressure type bearing means comprises a bearing section portion of said shaft and a journal section portion of said spindle facing the bearing section.

3. A unit according to claim 2, wherein grooves are formed in the bearing section for conducting air during rotation of said spindle and the journal section has a smooth surface.

4. A unit according to claim 1, wherein the thrust bearing means comprises a rotor ring magnet fixed to the outer surface of the hollow cylindrical spindle and having a magnetic pole on its outer surface and a stator ring magnet fixed to the motor housing and having a magnetic pole the inner surface of the stator ring magnet facing the outer surface of the rotor ring magnet.

5. A unit according to claim 1, which further comprises a cover for maintaining the housing airtight.

6. A unit according to claim 1, wherein the hollow cylindrical spindle is provided at both ends with support sections.

7. A unit according to claim 4 wherein said spindle has a support portion at each end thereof adapted for mounting to a chuck of a balancer.

* * * * *